(12) United States Patent
Kirillov

(10) Patent No.: US 12,710,653 B2
(45) Date of Patent: Aug. 18, 2026

(54) STEREOSCOPIC PROJECTION AND EYE-BOX STEERING SYSTEM FOR HEAD-UP DISPLAY

(71) Applicant: Infineon Technologies AG, Neubiberg (DE)

(72) Inventor: Boris Kirillov, Gratwein-Straßengel (AT)

(73) Assignee: Infineon Technologies AG, Neubiberg (DE)

( * ) Notice: Subject to any disclaimer, the term of this patent is extended or adjusted under 35 U.S.C. 154(b) by 364 days.

(21) Appl. No.: 18/484,737

(22) Filed: Oct. 11, 2023

(65) Prior Publication Data

US 2025/0123488 A1 Apr. 17, 2025

(51) Int. Cl.

| | |
|---|---|
| ***G02B 27/01*** | (2006.01) |
| ***B60K 35/23*** | (2024.01) |
| ***G02B 26/10*** | (2006.01) |
| ***G02B 30/33*** | (2020.01) |
| ***G06F 3/01*** | (2006.01) |
| ***G09G 3/00*** | (2006.01) |

(52) U.S. Cl.

CPC .......... *G02B 27/0172* (2013.01); *B60K 35/23* (2024.01); *G02B 27/0179* (2013.01); *G02B 30/33* (2020.01); *G06F 3/013* (2013.01); *G09G 3/001* (2013.01); *B60K 2360/23* (2024.01); *G02B 26/101* (2013.01); *G02B 2027/0134* (2013.01); *G02B 2027/0187* (2013.01); *G09G 2354/00* (2013.01)

(58) Field of Classification Search

CPC ....................... G02B 27/0172; G02B 27/0179; G02B 30/33; G02B 26/101; G02B 2027/0134; G02B 2027/0187; B60K 35/23; B60K 2360/23; G06F 3/013; G09G 3/001; G09G 2354/00

USPC .......................................................... 359/462

See application file for complete search history.

(56) References Cited

U.S. PATENT DOCUMENTS

2020/0073120 A1* 3/2020 von Spiegel ....... G02B 27/0093

FOREIGN PATENT DOCUMENTS

| | | |
|---|---|---|
| EP | 3287834 A1 | 2/2018 |
| EP | 4161071 A1 | 4/2023 |
| WO | 2018160765 A1 | 9/2018 |

* cited by examiner

*Primary Examiner* — Wyatt A Stoffa
*Assistant Examiner* — Mitchell T Oestreich
(74) *Attorney, Agent, or Firm* — Harrity & Harrity, LLP

(57) ABSTRACT

A head-up display (HUD) system includes a light transmitter configured to transmit a plurality of light beams corresponding to a stereoscopic image; a multi-lens array comprising a plurality of lenslets arranged in a diffuser plane, where each lenslet has a first portion corresponding to a first area of an eye-box associated with a first eye and a second portion corresponding to a second area of the eye-box associated with a second eye; a two-dimensional (2D) scanner configured to direct each of the plurality of light beams at either the first portion or the second portion of a respective lenslet; and a HUD reflector configured to direct each light beam originating from the first portion of a respective lenslet toward the first area of the eye-box, and direct each light beam originating from the second portion of a respective lenslet toward the second area of the eye-box.

18 Claims, 5 Drawing Sheets

202
Scanning trajectory
Light beam
206
212
210
212
210
212
210
212
210
212
210

STEREOSCOPIC PROJECTION AND EYE-BOX STEERING SYSTEM FOR HEAD-UP DISPLAY

BACKGROUND

Augmented reality (AR) is a technology that provides an interactive user-experience that combines real-world and computer-generated content. AR delivers visual elements, sound, haptics, and/or other sensory information to a user in order to alter the user's ongoing perception of a real-world environment in real-time. In other words, AR adds digital elements to a live experience of the real-world environment. The sensory information overlaid with the real-world environment can be constructive in order to add the sensory information to the real-world environment, or destructive in order to mask part of the real-world environment. The sensory information may be delivered to the user through a device, such as a mobile device. For example, a perceived part of the real-world environment may be augmented with digital information that is superimposed thereon. In some cases, visual content may be superimposed onto the user's line-of-sight (e.g., a user's real-world view). Thus, digital content may be overlaid onto the perceived part of the environment to visually provide additional information to the user. The digital content may be displayed on a transparent substrate or display, such as smart eye-glasses, smart contact lenses, head-up displays (HUDs), and head-mounted displays (HMDs), or projected directly onto a user's retina, as is the case for virtual retinal displays.

SUMMARY

In some implementations, a HUD system includes a light transmitter configured to transmit a first plurality of light beams corresponding to a first stereo image and a second plurality of light beams corresponding to a second stereo image; a multi-lens array comprising a plurality of lenslets arranged in a diffuser plane, wherein each lenslet of the plurality of lenslets has a first portion corresponding to a projection of the first stereo image and configured to project light toward a first area of an eye-box corresponding to a first eye, and wherein each lenslet of the plurality of lenslets has a second portion corresponding to a projection of the second stereo image and configured to project light toward a second area of the eye-box; a two-dimensional (2D) scanner arranged between the light transmitter and the multi-lens array, wherein the 2D scanner is configured to receive the first plurality of light beams from the light transmitter and direct each of the first plurality of light beams at the first portion of a respective lenslet, and wherein the 2D scanner is configured to receive the second plurality of light beams from the light transmitter and direct each of the second plurality of light beams at the second portion of the respective lenslet; and a HUD reflector configured to receive the first plurality of light beams from the multi-lens array and direct the first plurality of light beams toward the first area of the eye-box, and receive the second plurality of light beams from the multi-lens array and direct the second plurality of light beams toward the second area of the eye-box.

In some implementations, a HUD system includes a light transmitter configured to transmit a plurality of light beams corresponding to a stereoscopic image; a multi-lens array comprising a plurality of lenslets arranged in a diffuser plane, wherein each lenslet of the plurality of lenslets has a first portion configured to correspond to a first area of an eye-box corresponding to a first eye, and wherein each lenslet of the plurality of lenslets has a second portion configured to correspond to a second area of the eye-box corresponding to a second eye; a 2D scanner arranged between the light transmitter and the multi-lens array, wherein the 2D scanner is configured to receive the plurality of light beams from the light transmitter and direct each of the plurality of light beams at either the first portion or the second portion of a respective lenslet; and a HUD reflector configured to receive the plurality of light beams from the multi-lens array, direct each light beam originating from the first portion of a respective lenslet toward the first area of the eye-box, and direct each light beam originating from the second portion of a respective lenslet toward the second area of the eye-box.

BRIEF DESCRIPTION OF THE DRAWINGS

Implementations are described herein making reference to the appended drawings.

DETAILED DESCRIPTION

Figure 1:
FIG. 1 is a schematic block diagram of a 2D scanning system, according to one or more implementations.
Figure 1:
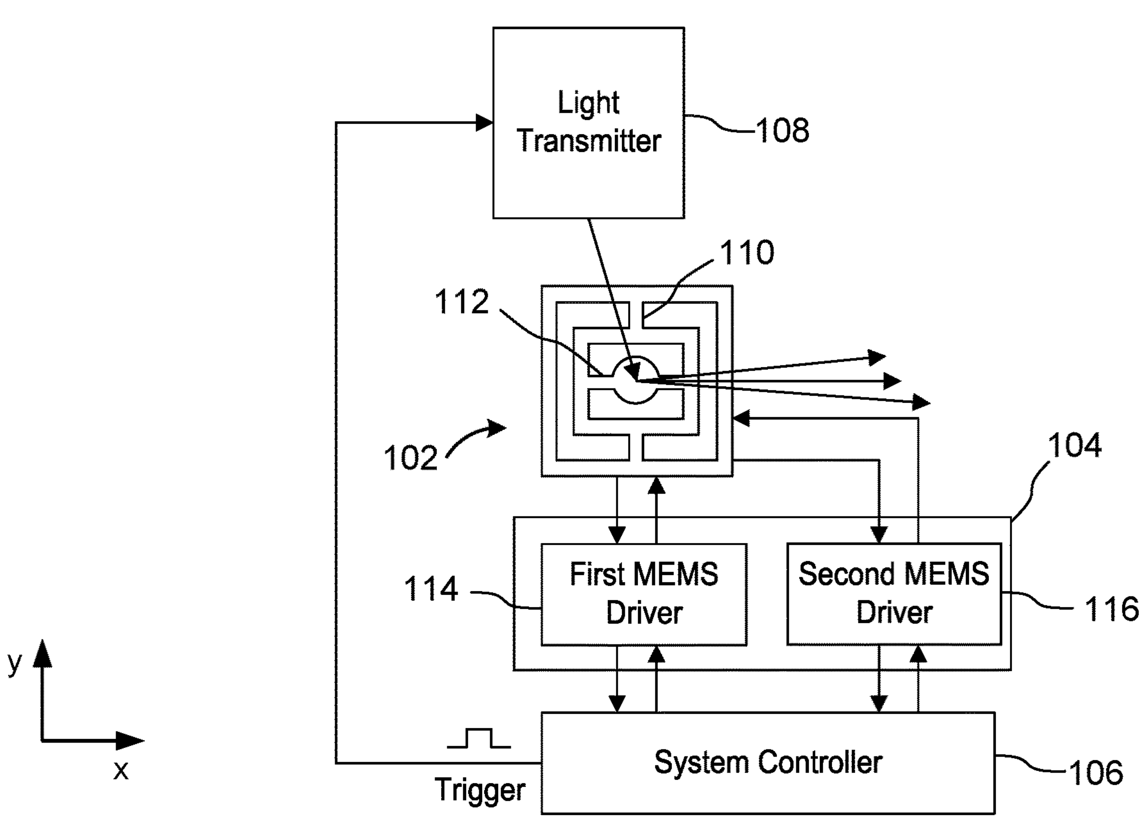

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A HUD, referred to as a head-up display or a heads-up display, is any transparent display that presents data without requiring users to look away from their usual viewpoints. For example, a HUD may be used in a vehicle to display images on a windshield. The HUD can provide a more pleasant driving experience. In addition, the HUD may be provided as a safety feature to enable a driver to operate the vehicle more safely. Projecting images into a space that can be observed by the driver is important. HUD systems are also cost sensitive.

An eye-box is an area in which a user may observe a projected image corresponding to eye position. An automotive HUD may require a large eye-box to accommodate a variety of driver heights and/or head positions. An alternative approach includes having a smaller eye-box combined with a head-tracking sensor and/or an eye-tracking sensor. However, this alternative approach requires a mechanism that can optically change a location of the eye-box to follow a head movement and/or an eye movement.

In addition, binocular vision can be implemented in image projection systems and can be used in some display technologies by projecting images into both eyes of the user. In some display technologies, stereoscopic imaging may be used to create an illusion of depth by projecting two slightly offset images separately to each eye of the user. For example, the two slightly offset images (e.g., two stereo images) may be of a same scene or a same object but with an illusion of being projected from slightly different angles or perspectives. In other words, the two stereo images may be combined to create a stereoscopic image that has the illusion of depth. Generating the two stereo images should be performed in a synchronized manner in order for the user to properly perceive a coherent image having the illusion of depth. Synchronization between the two stereo images can be difficult to achieve, due to a number of components that require synchronization. As a result, synchronization requirements can add complexity to the image projection system, which can lead to higher costs. In addition, the synchronization requirements can place limitations on the stereoscopic image. For example, it may be more difficult to synchronize the two stereo images over larger scanning areas. Therefore, the synchronization requirements may limit a size of the stereoscopic image, which can limit the user's experience.

In addition, an image projection system that provides binocular vision may comprise components that are duplicated for each eye. For example, separate scanners, light sources, drivers, and processing components may be provided in duplicate in such image projection systems. Duplication of the components can increase manufacturing costs and can make it more difficult to achieve synchronization. In addition, the duplication of the components can increase a power consumption of the image projection system due to a need to operate more components and due to a need for higher processing power to achieve synchronization between the components. Duplication of the components can also increase the system size, which is typically undesirable.

Some implementations disclosed herein are directed to a HUD system that includes a smaller eye-box and a mechanism that can optically change a location of the eye-box to follow a head movement and/or an eye movement. For example, the mechanism may be configured to steer an eye-box location by flexibly adapting a projected pixel location using a multi-lens array (MLA). In addition, or alternatively, the HUD system may generate a stereoscopic image by steering a first stereo image into a first area of the eye-box that corresponds to a first eye of a user, and steering a second stereo image into a second area of the eye-box that corresponds to a second eye of the user. For example, the MLA may be used to steer light beams (e.g., pixels) corresponding to the first stereo image into the first area of the eye-box, and steer light beams (e.g., pixels) corresponding to the second stereo image into the second area of the eye-box. Thus, not only can a location of each respective area of the eye-box be adapted based on a head position and/or eye position of the user, but stereoscopic images may be generated as well. Moreover, the use of the MLA may reduce a number of components needed to generate the stereoscopic images. Thus, an overall system cost may be reduced.

FIG. 1 is a schematic block diagram of a 2D scanning system 100, according to one or more implementations. In particular, the 2D scanning system 100 includes a microelectromechanical system (MEMS) mirror 102 implemented as a single scanning structure that is configured to steer or otherwise deflect light beams according to a 2D scanning pattern. The 2D scanning system 100 further includes a MEMS driver system 104, a system controller 106, and a light transmitter 108.

In the example shown in FIG. 1, the MEMS mirror 102 is a mechanical moving mirror (e.g., a MEMS micro-mirror) integrated on a semiconductor chip (not shown). The MEMS mirror 102 is configured to rotate or oscillate via rotation about two scanning axes that are typically orthogonal to each other. For example, the two scanning axes may include a first scanning axis 110 (e.g., an outer scanning axis) that enables the MEMS mirror 102 to steer light in a first scanning direction (e.g., an x-direction) and a second scanning axis 112 (e.g., an inner scanning axis) that enables the MEMS mirror 102 to steer light in a second scanning direction (e.g., a y-direction). As a result, the MEMS mirror 102 can direct light beams in two dimensions according to the 2D scanning pattern and may be referred to as a 2D MEMS mirror.

A scan can be performed to illuminate an area referred to as a field-of-view. The scan, such as an oscillating horizontal scan (e.g., from left to right and right to left of a field-of-view), an oscillating vertical scan (e.g., from bottom to top and top to bottom of a field-of-view), or a combination thereof (e.g., a Lissajous scan or a raster scan) can illuminate the field-of-view in a continuous scan fashion. In some implementations, the 2D scanning system 100 may be configured to transmit successive light beams (e.g., as successive light pulses) in different scanning directions to scan the field-of-view. In general, an entire field-of-view represents a scanning area at which the successive light beams are projected. The field-of-view can also be referred to as a field of illumination or as a projection area in a projection plane onto which an image is projected.

The MEMS mirror 102 can direct a transmitted light beam at a desired 2D coordinate (e.g., an x-y coordinate) in the field-of-view. In some implementations, such as image projection systems, the desired 2D coordinate may correspond to an image pixel of a projected image, with different 2D coordinates corresponding to different image pixels of the projected image. In some implementations, an image projection system may include a HUD and the MEMS mirror 102 may be arranged to receive the transmitted light beams and steer (scan) the transmitted light beams onto a display screen.

Accordingly, multiple light beams transmitted at different transmission times or a continuous light beam can be steered by the MEMS mirror 102 at the different 2D coordinates of the field-of-view in accordance with the 2D scanning pattern. The MEMS mirror 102 can be used to scan the field-of-view in both scanning directions by changing an angle of deflection of the MEMS mirror 102 on each of the first scanning axis 110 and the second scanning axis 112.

A rotation of the MEMS mirror 102 on the first scanning axis 110 may be performed between two predetermined extremum deflection angles (e.g., +/−5 degrees, +/−15 degrees, etc.). Likewise, a rotation of the MEMS mirror 102 on the second scanning axis 112 may be performed between two predetermined extremum deflection angles (e.g., +/−5 degrees, +/−15 degrees, etc.). In some implementations, depending on the 2D scanning pattern, the two predetermined extremum deflection angles used for the first scanning axis 110 may be the same as the two predetermined extremum deflection angles used for the second scanning axis 112. In some implementations, depending on the 2D scanning pattern, the two predetermined extremum deflection angles used for the first scanning axis 110 may be different from the two predetermined extremum deflection angles used for the second scanning axis 112.

In some implementations, the MEMS mirror 102 can be a resonator (e.g., a resonant MEMS mirror) configured to oscillate side-to-side about the first scanning axis 110 at a first frequency (e.g., a first resonance frequency) and configured to oscillate top-to-bottom about the second scanning axis 112 at a second frequency (e.g., a second resonance frequency). Thus, the MEMS mirror 102 can be continuously driven about the first scanning axis 110 and the second scanning axis 112 to perform a continuous scanning operation. As a result, light beams reflected by the MEMS mirror 102 are scanned into the field-of-view in accordance with the 2D scanning pattern.

Different frequencies or a same frequency may be used for the first scanning axis 110 and the second scanning axis 112 for defining the 2D scanning pattern. For example, a raster scanning pattern or a Lissajous scanning pattern may be achieved by using different frequencies for the first frequency and the second frequency. Raster scanning and Lissajous scanning are two types of scanning that can be implemented in display applications, light scanning applications, and light steering applications, to name a few. As an example, Lissajous scanning is typically performed using two resonant scanning axes which are driven at different constant scanning frequencies with a defined fixed frequency ratio therebetween that forms a specific Lissajous pattern and frame rate. In order to properly carry out the Lissajous scanning or the raster scanning, synchronization of the two scanning axes is performed by the system controller 106 in conjunction with transmission timings of the light transmitter 108.

For each respective scanning axis, including the first scanning axis 110 and the second scanning axis 112, the MEMS mirror 102 includes an actuator structure used to drive the MEMS mirror 102 about the respective scanning axis. Each actuator structure may include interdigitated finger electrodes made of interdigitated mirror combs and frame combs to which a drive voltage (e.g., an actuation signal or driving signal) is applied by the MEMS driver system 104. Applying a difference in electrical potential between interleaved mirror combs and frame combs creates a driving force between the mirror combs and the frame combs, which creates a torque on a mirror body of the MEMS mirror 102 about the intended scanning axis. The drive voltage can be toggled between two voltages, resulting in an oscillating driving force. The oscillating driving force causes the MEMS mirror 102 to oscillate back and forth on the respective scanning axis between two extrema. Depending on the configuration, this actuation can be regulated or adjusted by adjusting a drive voltage off time, a voltage level of the drive voltage (e.g., a high-voltage (HV) level), or a duty cycle.

In other examples, the MEMS mirror 102 may use other actuation methods to drive the MEMS mirror 102 about the respective scanning axes. For example, these other actuation methods may include electromagnetic actuation and/or piezoelectric actuators. In electromagnetic actuation, the MEMS mirror 102 may be immersed in a magnetic field. and an alternating electric current through conductive paths may create the oscillating torque around the scanning axis. Piezoelectric actuators may be integrated in leaf springs of the MEMS mirror 102, or the leaf springs may be made of piezoelectric material to produce alternating beam bending forces in response to an electrical signal to generate the oscillation torque.

The MEMS driver system 104 may be configured to generate driving signals (e.g., actuation signals) to drive the MEMS mirror 102 about the first scanning axis 110 and the second scanning axis 112. In particular, the MEMS driver system 104 may be configured to apply the driving signals to the actuator structure of the MEMS mirror 102. In some implementations, the MEMS driver system 104 includes a first MEMS driver 114 configured to drive the MEMS mirror 102 about the first scanning axis 110 and a second MEMS driver 116 configured to drive the MEMS mirror 102 about the second scanning axis 112. In implementations in which the MEMS mirror 102 is used as an oscillator, the first MEMS driver 114 is configured to drive an oscillation of the MEMS mirror 102 about the first scanning axis 110 at the first frequency, and the second MEMS driver 116 is configured to drive an oscillation of the MEMS mirror 102 about the second scanning axis 112 at the second frequency.

The first MEMS driver 114 may be configured to sense an outer axis movement (e.g., a first rotational position) of the MEMS mirror 102 about the first scanning axis 110 using an outer axis sensor and provide first position information indicative of the first rotational position (e.g., tilt angle or degree of rotation about the first scanning axis 110) to the system controller 106. Similarly, the second MEMS driver 116 may be configured to sense an inner axis movement (e.g., a second rotational position) of the MEMS mirror 102 about the second scanning axis 112 using an inner axis sensor and provide second position information indicative of the second rotational position (e.g., tilt angle or degree of rotation about the second scanning axis 112) to the system controller 106.

The system controller 106 may use the first position information and the second position information to trigger light beams at the light transmitter 108. For example, the system controller 106 may use the first position information and the second position information to set a transmission time of light transmitter 108 in order to target a particular 2D coordinate of the 2D scanning pattern. Thus, a higher accuracy in position sensing of the MEMS mirror 102 by the first MEMS driver 114 and the second MEMS driver 116 may result in the system controller 106 providing more accurate and precise control of other components of the 2D scanning system 100.

As noted above, the first MEMS driver 114 and the second MEMS driver 116 may apply a drive voltage to a corresponding actuator structure of the MEMS mirror 102 as the driving signal to drive a rotation (e.g., an oscillation) of the MEMS mirror 102 about a respective scanning axis (e.g., the first scanning axis 110 or the second scanning axis 112). The drive voltage can be switched or toggled between an HV level and a low-voltage (LV) level resulting in an oscillating driving force. In some implementations, the LV level may be zero (e.g., the drive voltage is off), but is not limited thereto and could be a non-zero value. When the drive voltage is toggled between an HV level and an LV level, and the LV level is set to zero, it can be said that the drive voltage is toggled on and off (HV on/off). The oscillating driving force causes the MEMS mirror 102 to oscillate back and forth on the first scanning axis 110 or the second scanning axis 112 between two extrema. The drive voltage may be a constant drive voltage, meaning that the drive voltage is the same voltage when actuated (e.g., toggled on), or one or both of the HV level or the LV level of the drive voltage may be adjustable. However, it will be understood that the drive voltage is being toggled between the HV level and the LV level in order to produce the mirror oscillation. Depending on a configuration, this actuation can be regulated or adjusted by the system controller 106 by adjusting the drive voltage off time, a voltage level of the drive voltage, or a duty cycle. As noted above, frequency and phase of the drive voltage can also be regulated and adjusted.

In some implementations, the system controller 106 is configured to set a driving frequency of the MEMS mirror 102 for each scanning axis and is capable of synchronizing the oscillations about the first scanning axis 110 and the second scanning axis 112. In particular, the system controller 106 may be configured to control an actuation of the MEMS mirror 102 about each scanning axis by controlling the driving signals. The system controller 106 may control the frequency, the phase, the duty cycle, the HV level, and/or the LV level of the driving signals to control the actuations about the first scanning axis 110 and the second scanning axis 112. The actuation of the MEMS mirror 102 about a particular scanning axis controls its range of motion and scanning rate about that particular scanning axis.

For example, to make a Lissajous scanning pattern reproduce itself periodically with a frame rate frequency, the first frequency at which the MEMS mirror 102 is driven about the first scanning axis 110 and the second frequency at which the MEMS mirror 102 is driven about the second scanning axis 112 are different. A difference between the first frequency and the second frequency is set by a fixed frequency ratio that is used by the 2D scanning system 100 to form a repeatable Lissajous pattern (frame) with a frame rate. A new frame begins each time the Lissajous scanning pattern restarts, which may occur when a phase difference between a mirror phase about the first scanning axis 110 and a mirror phase about the second scanning axis 112 is zero. The system controller 106 may set the fixed frequency ratio and synchronize the oscillations about the first scanning axis 110 and the second scanning axis 112 to ensure that this fixed frequency ratio is maintained based on the first position information and the second position information received from the first MEMS driver 114 and the second MEMS driver 116, respectively.

The light transmitter 108 may include one or more light sources, such as one or more laser diodes or one or more light emitting diodes, for generating one or more light beams. In some implementations, the light transmitter 108 may be configured to sequentially transmit a plurality of light beams (e.g., light pulses) as the MEMS mirror 102 changes its transmission direction in order to target different 2D coordinates. The plurality of light beams may include pixel light generated by a red-green-blue (RGB) light source. A transmission sequence of the plurality of light beams and a timing thereof may be implemented by the light transmitter 108 according to a trigger signal received from the system controller 106. In some implementations, the light transmitter 108 may include two RGB light sources, with each RGB light source being configured to transmit a respective plurality of light beams (e.g., a respective plurality of RGB light beams).

It is to be noted that a particular RGB light beam may be made of a single color of light, a combination of two colors of light, or a combination of all three colors of light. For example, the system controller 106 may control which R, G, B light emitting diode of a particular RGB light source is triggered for a light transmission, including some or all of the R, G, B light emitting diodes. While some of the R, G, B light emitting diodes may remain inactive during a light transmission, an output light beam may still be referred to as an RGB light beam (e.g., despite not including all three colors of light). Alternatively, an "RGB light beam" may be referred to as a "pixel light beam" that includes one or more colors of light depending on the desired pixel color to be projected into a corresponding field-of-view. Thus, the terms "RGB light beam" and "pixel light beam" can be used interchangeably.

The system controller 106 is configured to control components of the 2D scanning system 100. In certain applications, the system controller 106 may also be configured to receive programming information with respect to the 2D scanning pattern and control a timing of the plurality of light beams generated by the light transmitter 108 based on the programming information. Thus, the system controller 106 may include both processing and control circuitry that is configured to generate control signals for controlling the light transmitter 108, the first MEMS driver 114, and the second MEMS driver 116.

In some implementations, the system controller 106 is configured to use independent measurements of the outer axis movement about the first scanning axis 110 and the inner axis movement about the second scanning axis 112 to drive and correctly synchronize transmission timings of the plurality of light beams with the movements of the MEMS mirror 102 and to synchronize a first scanning frequency of the first scanning axis 110 and a second scanning frequency of the second scanning axis 112. For example, the system controller 106 may be configured to set the driving frequencies of the MEMS mirror 102 for the first scanning axis 110 and the second scanning axis 112, and may be capable of synchronizing the oscillations about the first scanning axis 110 and the second scanning axis 112 to generate the 2D scanning pattern. In some implementations, in which the plurality of light beams is used, the system controller 106 may be configured to generate the trigger signal used for triggering the light transmitter 108 to generate the plurality of light beams. Using the trigger signal, the system controller 106 can control the transmission times of the plurality of light beams of the light transmitter 108 to achieve a desired illumination pattern within the field-of-view. The desired illumination pattern is produced by a combination of the 2D scanning pattern produced by the MEMS mirror 102 and the transmission times triggered by the system controller 106.

As indicated above, FIG. 1 is provided as an example. Other examples may differ from what is described with regard to FIG. 1. In practice, the 2D scanning system 100 may include additional components, fewer components, different components, or differently arranged components than those shown in FIG. 1 without deviating from the disclosure provided above. Additionally, two or more components shown in FIG. 1 may be implemented within a single component, or a single component shown in FIG. 1 may be implemented as multiple, distributed components. Additionally, or alternatively, a set of components (e.g., one or more components) of the 2D scanning system 100 may perform one or more functions described as being performed by another set of components of the 2D scanning system 100.

Figure 2A:
FIGS. 2A and 2B show schematic block diagrams of a side view of a HUD system according to one or more implementations.
Figure 2A:
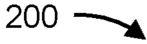
Figure 2A:
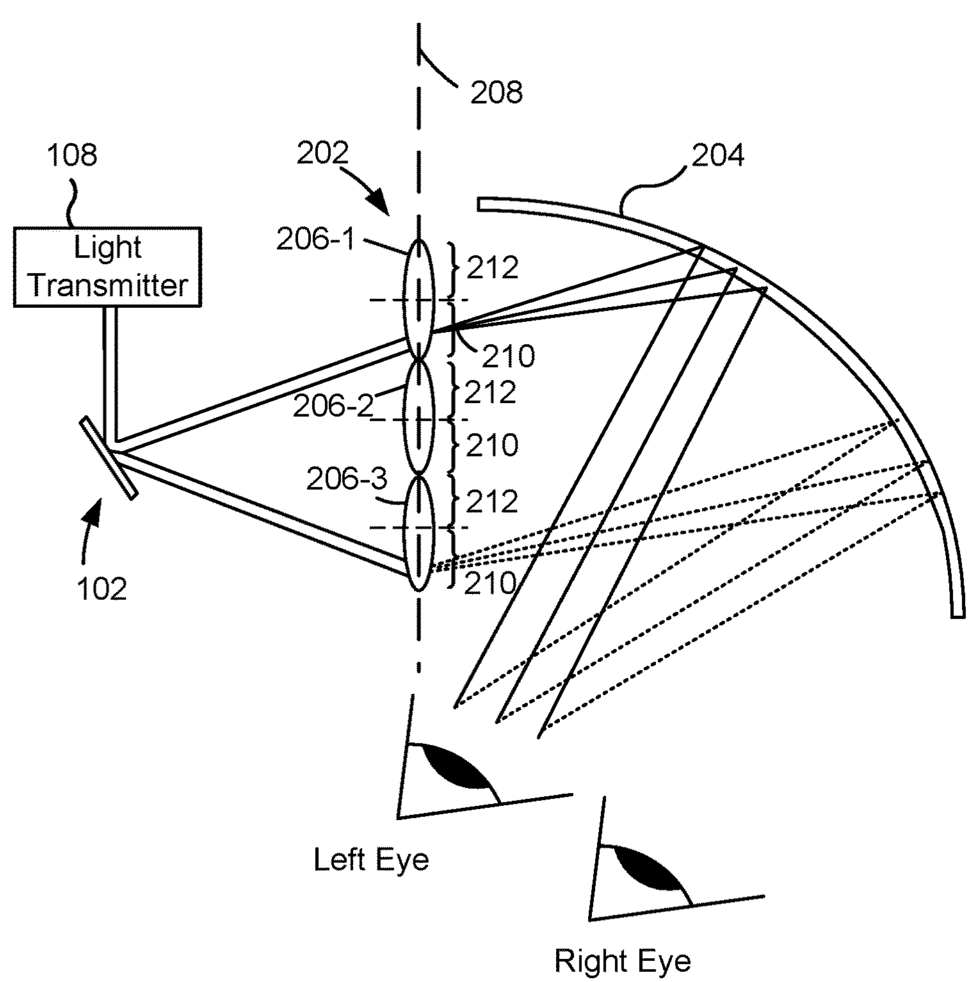
Figure 2B:
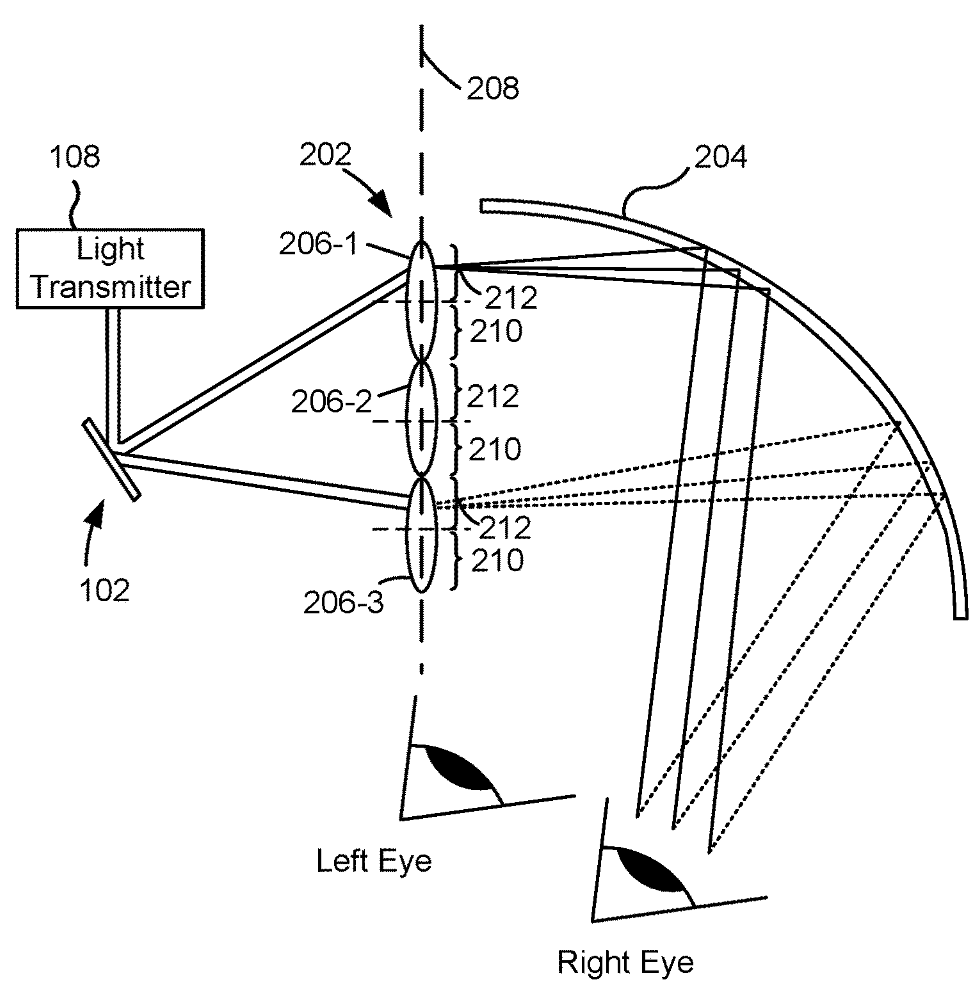

FIGS. 2A and 2B show schematic block diagrams of a side view of a HUD system 200 according to one or more implementations. For example, FIG. 2A shows using the HUD system 200 to project a first stereo image onto a first eye of a user (e.g., a left eye) and FIG. 2B shows using the HUD system 200 to project a second stereo image onto a second eye of the user (e.g., a right eye). The HUD system 200 may include the 2D scanning system 100 described in connection with FIG. 1. The HUD system 200 may include the light transmitter 108 and the MEMS mirror 102 implemented as a 2D scanner. Additionally, the HUD system 200 may include a multi-lens array 202 and a HUD reflector 204.

The light transmitter 108 may transmit a plurality of light beams corresponding to a stereoscopic image. For example, the light transmitter 108 may transmit a first plurality of light beams corresponding to the first stereo image and transmit a second plurality of light beams corresponding to the second stereo image. Each light beam of the plurality of light beams may be a collimated beam of pixel light.

The multi-lens array 202 includes a plurality of lenslets 206-1, 206-2, and 206-3 (collectively referred to as lenslets 206) arranged in a diffuser plane 208. Each lenslet 206 has a first portion 210 configured to correspond to a first area of an eye-box corresponding to the first eye, and each lenslet 206 has a second portion 212 configured to correspond to a second area of the eye-box corresponding to the second eye. For example, the first portion 210 may be a lower half or a first vertical portion of a respective lenslet 206, and the second portion 212 may be an upper half or a second vertical portion of a respective lenslet 206.

The first portions 210 may correspond to a projection of the first stereo image and may be configured to project light toward the first area of the eye-box associated with the first eye. The second portions 212 may correspond to a projection of the second stereo image and may be configured to project light toward the second area of the eye-box associated with the second eye. In addition, each lenslet 206 may correspond to a different pixel of the first stereo image and the second stereo image. For example, lenslet 206-1 may correspond to a first pixel of the first stereo image and a first pixel of the second stereo image, lenslet 206-2 may correspond to a second pixel of the first stereo image and a second pixel of the second stereo image, and lenslet 206-3 may correspond to a third pixel of the first stereo image and a third pixel of the second stereo image.

A beam width of each light beam may be sized appropriately to ensure that each light beam is incident on only one of the first portion 210 or the second portion 212 of a respective lenslet 206. For example, each of the first plurality of light beams may have a first beam width that is equal to or less than a size of the first portion 210, and each of the second plurality of light beams may have a second beam width that is equal to or less than a size of the second portion 212. As noted above, the first portion 210 of each lenslet 206 may be a first half of the lenslet 206 and the second portion 212 of each lenslet 206 may be a second half of the lenslet 206. In some implementations, the first beam width of the first plurality of light beams may be equal to or less than 30% of the size of the first portion 210, and the second beam width of the second plurality of light beams may be equal to or less than 30% of the size of the second portion 212.

In addition, wherein each lenslet 206 may produce a first divergent light beam from a respective first light beam of the first plurality of light beams, and may produce a second divergent light beam from a respective second light beam of the second plurality of light beams. In other words, each lenslet 206 may be configured to diffuse or spread a beam width of a light beam. Thus, each first divergent light beam and each second divergent light beam produced by the multi-lens array 202 has an angle of divergence. A size of the first area of the eye-box and a size of the second area of the eye-box may be proportional to the angle of divergence.

The MEMS mirror 102 (e.g., the 2D scanner) is arranged between the light transmitter 108 and the multi-lens array 202. Thus, the MEMS mirror 102 may receive the plurality of light beams from the light transmitter 108 and direct each of the plurality of light beams at either the first portion 210 or the second portion 212 of a respective lenslet 206. For example, the MEMS mirror 102 may receive the first plurality of light beams from the light transmitter 108 and direct each of the first plurality of light beams at the first portion 210 of a respective lenslet 206. Additionally, the MEMS mirror 102 may receive the second plurality of light beams from the light transmitter 108 and direct each of the second plurality of light beams at the second portion 212 of a respective lenslet 206. The MEMS mirror 102 may be configured to direct each of the first plurality of light beams exclusively at the first portion 210 of a respective lenslet 206, and to direct each of the second plurality of light beams exclusively at the second portion 212 of a respective lenslet 206. Thus, the first stereo image may be formed from the first plurality of light beams that pass through the first portions 210 of the multi-lens array 202, and the second stereo image may be formed from the second plurality of light beams that pass through the second portions 212 of the multi-lens array 202.

The HUD reflector 204 may receive the plurality of light beams from the multi-lens array, direct each light beam originating from the first portion 210 of a respective lenslet 206 toward the first area of the eye-box, and direct each light beam originating from the second portion 212 of a respective lenslet 206 toward the second area of the eye-box. For example, the HUD reflector 204 may receive the first plurality of light beams from the multi-lens array 202 and direct the first plurality of light beams toward the first area of the eye-box. Additionally, the HUD reflector 204 may receive the second plurality of light beams from the multi-lens array 202 and direct the second plurality of light beams toward the second area of the eye-box. Since the multi-lens array 202 diffuses the plurality of light beams to produce a plurality of divergent light beams, the HUD reflector 204 may receive the first plurality of light beams from the multi-lens array 202 as a first plurality of divergent light beams, and may receive the second plurality of light beams from the multi-lens array 202 as a second plurality of divergent light beams.

The MEMS mirror 102 may steer the plurality of light beams in two dimensions across the multi-lens array 202, including a first dimension (e.g., a lateral dimension) and a second dimension (e.g., a vertical dimension). The first dimension may correspond to a location of the eye-box, whereas the second dimension may correspond to an area (e.g., the first area or the second area) within the eye-box. For example, the MEMS mirror 102 may steer the first plurality of light beams and the second plurality of light beams in the first dimension of the lenslets 206 to steer the location of the eye-box, and the MEMS mirror 102 may steer the first plurality of light beams and the second plurality of light beams in the second dimension of the lenslets 206 to steer the first plurality of light beams at the first portions 210 of the lenslets and to steer the second plurality of light beams at the second portions 212 of the lenslets. In other words, the MEMS mirror 102 may steer each light beam of the first plurality of light beams in the lateral dimension of a respective lenslet 206 to steer a location of the first area of the eye-box, and may steer each light beam of the second plurality of light beams in the lateral dimension of a respective lenslet 206 to steer a location of the second area of the eye-box.

As a result, the location of the eye-box, and particularly, the location of the first area and the second area of the eye-box, may be dynamically adjusted based on an eye position and a viewing direction of the user by changing a lateral portion of each lenslet 206 at which one or more light beams are directed. For example, targeting a left lateral portion of each lenslet 206 may move the first area and the second area of the eye-box to the left, targeting a center lateral portion of each lenslet 206 may move the first area and the second area of the eye-box to the center, and targeting a right lateral portion of each lenslet 206 may move the first area and the second area of the eye-box to the right. The HUD system 200 may use eye-tracking to detect the eye position and a viewing direction of the user. In order to provide enough flexibility to steer the location of the eye-box, the first beam width of the first plurality of light beams may be equal to or less than 30% of the size of the first portion, and the second beam width of the second plurality of light beams may be equal to or less than 30% of the size of the second portion.

The HUD system 200 may combine the first stereo image and the second stereo image in the eye-box to produce the stereoscopic image. For example, the HUD system 200 may include a windshield (not illustrated) that includes a windshield reflector that may be configured to receive the first plurality of divergent light beams from the HUD reflector 204 and project the first stereo image into the first area of the eye-box, and receive the second plurality of divergent light beams from the HUD reflector 204 and project the second stereo image into the second area of the eye-box.

The number and arrangement of components shown in FIGS. 2A and 2B are provided as an example. In practice, the HUD system 200 may include additional components, fewer components, different components, or differently arranged components than those shown in FIGS. 2A and 2B.

Figure 3:
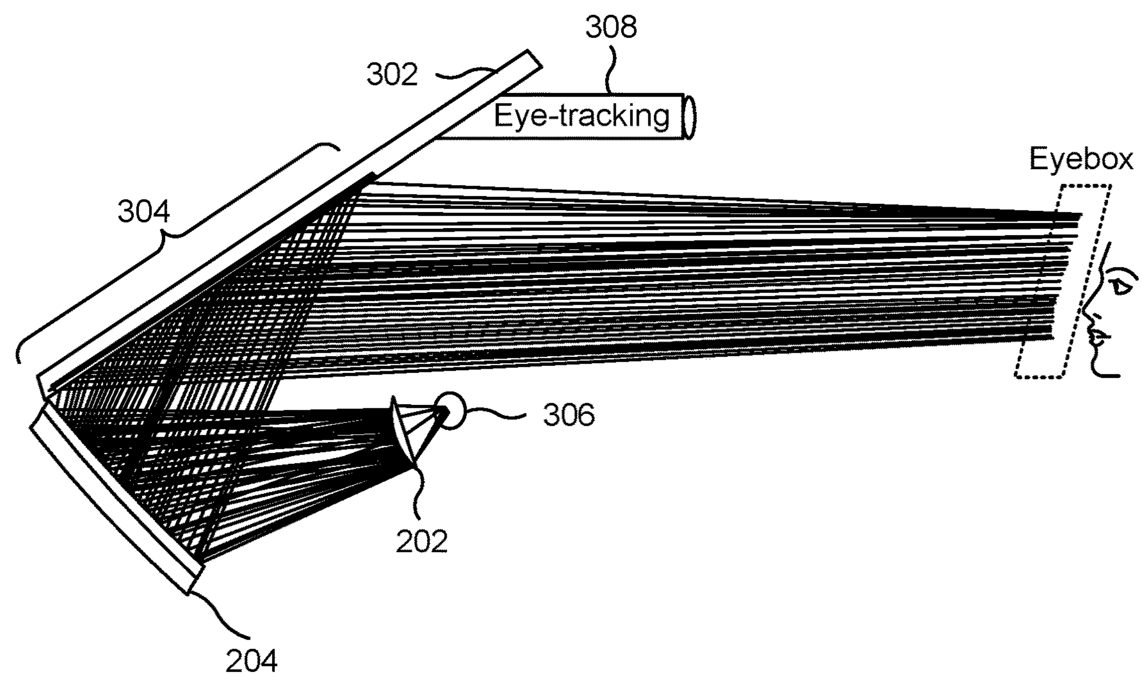
FIG. 3 illustrates an example HUD system according to one or more implementations.

FIG. 3 illustrates an example HUD system 300 according to one or more implementations. The HUD system 300 is similar to the HUD system 200 described in connection with FIGS. 2A and 2B, but additionally includes a windshield 302 of a vehicle. In some implementations, the HUD system 300 includes a windshield reflector 304 that is mounted on or embedded in the windshield 302. The light transmitter 108 and the MEMS mirror 102 (e.g., the 2D scanner) may be provided as an image generation unit 306.

The HUD reflector 204 may receive each of the first plurality of light beams from the multi-lens array 202 and project the first stereo image formed by the first plurality of light beams and a 2D scanning pattern implemented by the MEMS mirror 102 onto a first display area of the windshield 302 (e.g., onto the windshield reflector 304) by reflecting each of the first plurality of light beams onto the windshield 302. The HUD reflector 204 may receive each of the second plurality of light beams from the multi-lens array 202 and project the second stereo image formed by the second plurality of light beams and the 2D scanning pattern implemented by the MEMS mirror 102 onto a second display area of the windshield 302 (e.g., onto the windshield reflector 304) by reflecting each of the second plurality of light beams onto the windshield 302.

The HUD reflector 204 has a curved body, such as a convex shape or convex contour, that is designed to receive the first and the second plurality of light beams and reflect the first and the second plurality of light beams toward a respective display area of the windshield 302 (e.g., onto a respective area of the windshield reflector 304). The windshield reflector 304 may be configured to reflect each of the first and the second plurality of light beams toward the user, at which point the user perceives the projected first stereo image formed by the first plurality of light beams in the first area of the eye-box and perceives the projected second stereo image formed by the second plurality of light beams in the second area of the eye-box. Thus, FIG. 3 illustrates a first full optical path (e.g., a first full transmission path) of the first plurality of light beams, and a second full optical path (e.g., a second full transmission path) of the second plurality of light beams.

The HUD system 300 may also include an eye-tracking monitor 308 configured to track an eye position and/or a viewing direction of the user. The eye-tracking monitor 308 may include a sensor (e.g., an image sensor or camera) and a processor that is configured to generate position information based on sensor data provided by the sensor. A controller (e.g., the system controller 106) may receive the position information and control a transmission timing of the first and the second plurality of light beams based on the 2D scanning pattern in order to steer the first and the second plurality of light beams in the lateral and the vertical dimensions. For example, the controller may use the position information to steer the first and the second plurality of light beams in the lateral dimension to shift a location of the eye-box. Thus, the MEMS mirror 102 may steer the first plurality of light beams and the second plurality of light beams in the lateral dimension of respective lenslets 206 to steer the location of the eye-box based on the eye position and/or the viewing direction of the user.

As a result, the controller may control the light transmitter 108 and the MEMS mirror 102 in order to steer the plurality of light beams in the lateral dimension to steer the location of the eye-box based on the viewing direction of the user, and steer the plurality of light beams in the vertical dimension to steer each light beam of the plurality of light beams at the first portion or at a second portion of a respective lenslet 206.

As indicated above, FIG. 3 is provided as an example. Other examples may differ from what is described with regard to FIG. 3.

Figures 4, 5:
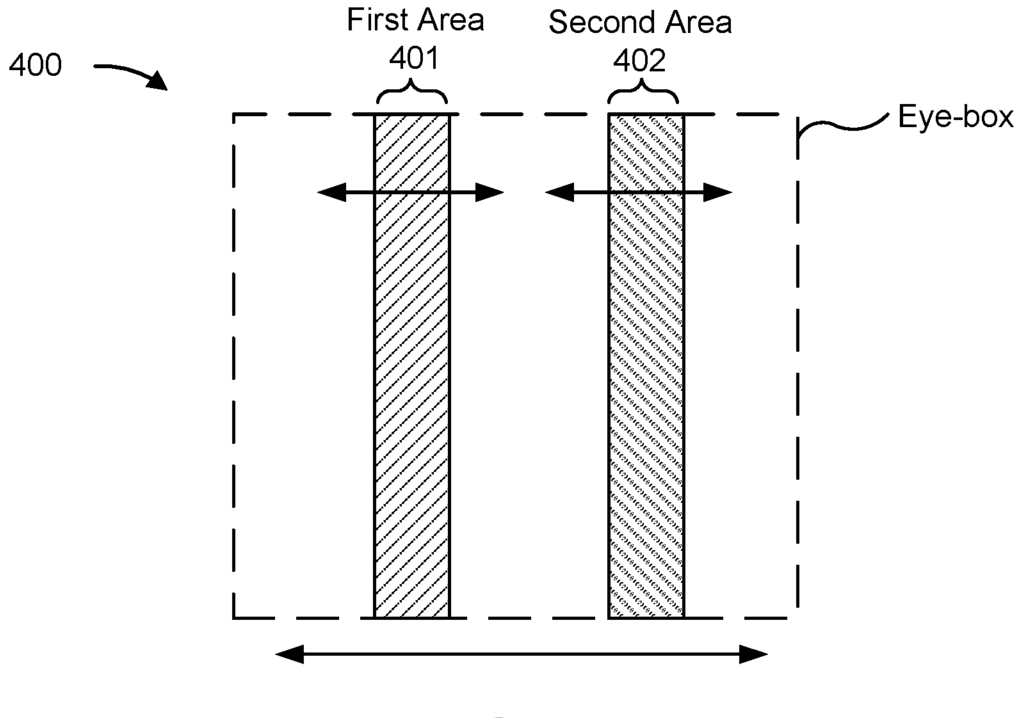
FIG. 4 shows an eye-box according to one or more implementations.
FIG. 5 shows a front view of a multi-lens array according to one or more implementations.

FIG. 4 shows an eye-box 400 according to one or more implementations. The eye-box 400 includes a first area 401 in which the first stereo image is projected and a second area 402 in which the second stereo image is projected. The locations of the first area 401 and the second area 402 may be adjusted by steering light beams in the lateral dimension of the lenslets 206. For example, targeting a left lateral portion of each lenslet 206 may move the first area 401 and the second area 402 of the eye-box to the left, targeting a center lateral portion of each lenslet 206 may move the first area 401 and the second area 402 of the eye-box to the center, and targeting a right lateral portion of each lenslet 206 may move the first area 401 and the second area 402 of the eye-box to the right. Accordingly, a location of the entire eye-box 400 may be shifted. A targeted lateral portion of the lenslets 206 may be adjusted as a user changes a viewing direction. For example, the HUD system 200 may use eye-tracking to detect the eye position and the viewing direction of the user. In order to provide enough flexibility to steer the location of the first area 401 and the second area 402, the beam widths of the first and the second plurality of light beams may be equal to or less than 30% of a width of a lenslet 206 (e.g., assuming all lenslets 206 have a same width dimension).

As indicated above, FIG. 4 is provided as an example. Other examples may differ from what is described with regard to FIG. 4.

FIG. 5 shows a front view of the multi-lens array 202 according to one or more implementations. The multi-lens array 202 is an array of lenslets 206. Each lenslet 206 may be substantially equal in size. In this example, the multi-lens array 202 is a 5×5 array. However, a size of the multi-lens array 202 may be adapted according to an application. In this example, a Lissajous scan is performed on the multi-lens array 202. Thus, the plurality of light beams follow a scanning trajectory that follows a Lissajous pattern. The system controller 106 may control a transmission timing of the plurality of light beams to target a particular vertical area and a particular lateral portion of each lenslet 206. Light beams targeted on the first portion 210 may be directed to the first eye and light beams targeted on the second portion 212 may be directed to the second eye. Moreover, the location of the eye-box may be shifted based on targeting different lateral portions of the lenslets 206.

As indicated above, FIG. 5 is provided as an example. Other examples may differ from what is described with regard to FIG. 5.

The following provides an overview of some Aspects of the present disclosure:

Aspect 1: A HUD system, comprising: a light transmitter configured to transmit a first plurality of light beams corresponding to a first stereo image and a second plurality of light beams corresponding to a second stereo image; a multi-lens array comprising a plurality of lenslets arranged in a diffuser plane, wherein each lenslet of the plurality of lenslets has a first portion corresponding to a projection of the first stereo image and configured to project light toward a first area of an eye-box corresponding to a first eye, and wherein each lenslet of the plurality of lenslets has a second portion corresponding to a projection of the second stereo image and configured to project light toward a second area of the eye-box; a 2D scanner arranged between the light transmitter and the multi-lens array, wherein the 2D scanner is configured to receive the first plurality of light beams from the light transmitter and direct each of the first plurality of light beams at the first portion of a respective lenslet, and wherein the 2D scanner is configured to receive the second plurality of light beams from the light transmitter and direct each of the second plurality of light beams at the second portion of the respective lenslet; and a HUD reflector configured to receive the first plurality of light beams from the multi-lens array and direct the first plurality of light beams toward the first area of the eye-box, and receive the second plurality of light beams from the multi-lens array and direct the second plurality of light beams toward the second area of the eye-box.

Aspect 2: The HUD system of Aspect 1, wherein the first area of the eye-box is configured to correspond to a first eye, and wherein the second area of the eye-box is configured to correspond to a second eye.

Aspect 3: The HUD system of any of Aspects 1-2, wherein the first plurality of light beams and the second plurality of light beams are collimated beams of pixel light, and wherein each lenslet of the plurality of lenslets is configured to produce a first divergent light beam from a respective first light beam of the first plurality of light beams, and produce a second divergent light beam from a respective second light beam of the second plurality of light beams.

Aspect 4: The HUD system of Aspect 3, wherein each first divergent light beam and each second divergent light beam has an angle of divergence, and wherein a size of the first area of the eye-box and a size of the second area of the eye-box are proportional to the angle of divergence.

Aspect 5: The HUD system of Aspect 4, wherein the size of the first area of the eye-box and the size of the second area of the eye-box are proportional to or substantially equal to a product of the angle of divergence and a focal length of the HUD reflector.

Aspect 6: The HUD system of any of Aspects 1-5, wherein the HUD reflector is configured to receive the first plurality of light beams from the multi-lens array as a first plurality of divergent light beams, and receive the second plurality of light beams from the multi-lens array as a second plurality of divergent light beams.

Aspect 7: The HUD system of Aspect 6, further comprising: a windshield comprising a windshield reflector configured to receive the first plurality of divergent light beams from the HUD reflector and project the first stereo image into the first area of the eye-box, and receive the second plurality of divergent light beams from the HUD reflector and project the second stereo image into the second area of the eye-box.

Aspect 8: The HUD system of any of Aspects 1-7, wherein the HUD system is configured to combine the first stereo image and the second stereo image in the eye-box to produce a stereoscopic image.

Aspect 9: The HUD system of any of Aspects 1-8, wherein each of the first plurality of light beams has a first beam width that is equal to or less than a size of the first portion, and wherein each of the second plurality of light beams has a second beam width that is equal to or less than a size of the second portion.

Aspect 10: The HUD system of Aspect 9, wherein the first portion of each lenslet is a first half of the lenslet and the second portion of each lenslet is a second half of the lenslet.

Aspect 11: The HUD system of Aspect 9, wherein the 2D scanner is configured to direct each of the first plurality of light beams exclusively at the first portion of the respective lenslet, and wherein the 2D scanner is configured to direct each of the second plurality of light beams exclusively at the second portion of the respective lenslet.

Aspect 12: The HUD system of any of Aspects 1-11, wherein the 2D scanner is configured to steer the first plurality of light beams and the second plurality of light beams in a first dimension of the respective lenslet to steer a location of the eye-box.

Aspect 13: The HUD system of Aspect 12, wherein the 2D scanner is configured to steer the first plurality of light beams and the second plurality of light beams in a second dimension of the respective lenslet to steer the first plurality of light beams at the first portion of the respective lenslet and to steer the second plurality of light beams at the second portion of the respective lenslet.

Aspect 14: The HUD system of Aspect 13, wherein the 2D scanner is configured to steer the first plurality of light beams and the second plurality of light beams according to a Lissajous scanning pattern.

Aspect 15: The HUD system of any of Aspects 1-14, wherein the 2D scanner is configured to steer the first plurality of light beams in a lateral dimension of the respective lenslet to steer a location of the first area of the eye-box, and wherein the 2D scanner is configured to steer the second plurality of light beams in the lateral dimension of the respective lenslet to steer a location of the second area of the eye-box.

Aspect 16: The HUD system of Aspect 15, wherein each of the first plurality of light beams has a first beam width that is equal to or less than 30% of a size of the first portion, and wherein each of the second plurality of light beams has a second beam width that is equal to or less than 30% of a size of the second portion.

Aspect 17: The HUD system of any of Aspects 1-16, further comprising: an eye-tracking monitor configured to track a viewing direction of a user, wherein the 2D scanner is configured to steer the first plurality of light beams and the second plurality of light beams in a lateral dimension of the respective lenslet to steer a location of the eye-box based on the viewing direction of the user.

Aspect 18: The HUD system of any of Aspects 1-17, further comprising: an eye-tracking monitor configured to track a viewing direction of a user, wherein the 2D scanner is configured to steer the first plurality of light beams in a lateral dimension of the respective lenslet to steer a location of the first area of the eye-box based on the viewing direction of the user, and wherein the 2D scanner is configured to steer the second plurality of light beams in the lateral dimension of the respective lenslet to steer a location of the second area of the eye-box based on the viewing direction of the user.

Aspect 19: A HUD system, comprising: a light transmitter configured to transmit a plurality of light beams corresponding to a stereoscopic image; a multi-lens array comprising a plurality of lenslets arranged in a diffuser plane, wherein each lenslet of the plurality of lenslets has a first portion configured to correspond to a first area of an eye-box corresponding to a first eye, and wherein each lenslet of the plurality of lenslets has a second portion configured to correspond to a second area of the eye-box corresponding to a second eye; a 2D scanner arranged between the light transmitter and the multi-lens array, wherein the 2D scanner is configured to receive the plurality of light beams from the light transmitter and direct each of the plurality of light beams at either the first portion or the second portion of a respective lenslet; and a HUD reflector configured to receive the plurality of light beams from the multi-lens array, direct each light beam originating from the first portion of a respective lenslet toward the first area of the eye-box, and direct each light beam originating from the second portion of a respective lenslet toward the second area of the eye-box.

Aspect 20: The HUD system of Aspect 19, further comprising: an eye-tracking monitor configured to track a viewing direction of a user, wherein the 2D scanner is configured to steer the plurality of light beams in a lateral dimension to steer a location of the eye-box based on the viewing direction of the user, and wherein the 2D scanner is configured to steer the plurality of light beams in a vertical dimension to steer each light beam of the plurality of light beams at the first portion or at a second portion of a respective lenslet.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations are possible in light of the above disclosure or may be acquired from practice of the implementations.

For example, although implementations described herein relate to MEMS devices with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit.

As used herein, the term "component" is intended to be broadly construed as hardware, firmware, or a combination of hardware and software. Systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein, refers to any of the foregoing structures or any other structure suitable for implementation of the techniques described herein. Software may be stored on a non-transitory computer-readable medium such that the non-transitory computer readable medium includes program code or a program algorithm stored thereon that, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal, further information. "Signal conditioning," as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a and b, a and c, b and c, and a, b, and c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A head-up display (HUD) system, comprising:

a light transmitter configured to transmit a first plurality of light beams corresponding to a first stereo image and a second plurality of light beams corresponding to a second stereo image;

a multi-lens array comprising a plurality of lenslets arranged in a diffuser plane, wherein each lenslet of the plurality of lenslets has a first portion corresponding to a projection of the first stereo image and configured to project light toward a first area of an eye-box corresponding to a first eye, and wherein each lenslet of the plurality of lenslets has a second portion corresponding to a projection of the second stereo image and configured to project light toward a second area of the eye-box;

a two-dimensional (2D) scanner arranged between the light transmitter and the multi-lens array, wherein the 2D scanner is configured to receive the first plurality of light beams from the light transmitter and direct each of the first plurality of light beams at the first portion of a respective lenslet of the plurality of lenslets, and wherein the 2D scanner is configured to receive the second plurality of light beams from the light transmitter and direct each of the second plurality of light beams at the second portion of the respective lenslet; and a HUD reflector configured to receive the first plurality of light beams from the multi-lens array and direct the first plurality of light beams toward the first area of the eye-box, and receive the second plurality of light beams from the multi-lens array and direct the second plurality of light beams toward the second area of the eye-box.

2. The HUD system of claim 1, wherein the first area of the eye-box is configured to correspond to a first eye, and wherein the second area of the eye-box is configured to correspond to a second eye.

3. The HUD system of claim 1, wherein the first plurality of light beams and the second plurality of light beams are collimated beams of pixel light, and wherein each lenslet of the plurality of lenslets is configured to produce a first divergent light beam from a respective first light beam of the first plurality of light beams, and produce a second divergent light beam from a respective second light beam of the second plurality of light beams.

4. The HUD system of claim 3, wherein each first divergent light beam and each second divergent light beam has an angle of divergence, and wherein a size of the first area of the eye-box and a size of the second area of the eye-box are proportional to the angle of divergence.

5. The HUD system of claim 4, wherein the size of the first area of the eye-box and the size of the second area of the eye-box are proportional to or substantially equal to a product of the angle of divergence and a focal length of the HUD reflector.

6. The HUD system of claim 1, wherein the HUD reflector is configured to receive the first plurality of light beams from the multi-lens array as a first plurality of divergent light beams, and receive the second plurality of light beams from the multi-lens array as a second plurality of divergent light beams.

7. The HUD system of claim 6, further comprising:

a windshield comprising a windshield reflector configured to receive the first plurality of divergent light beams from the HUD reflector and project the first stereo image into the first area of the eye-box, and receive the second plurality of divergent light beams from the HUD reflector and project the second stereo image into the second area of the eye-box.

8. The HUD system of claim 1, wherein the HUD system is configured to combine the first stereo image and the second stereo image in the eye-box to produce a stereoscopic image.

9. The HUD system of claim 1, wherein each of the first plurality of light beams has a first beam width that is equal to or less than a size of the first portion, and wherein each of the second plurality of light beams has a second beam width that is equal to or less than a size of the second portion.

10. The HUD system of claim 9, wherein the first portion of each lenslet is a first half of the lenslet and the second portion of each lenslet is a second half of the lenslet.

11. The HUD system of claim 9, wherein the 2D scanner is configured to direct each of the first plurality of light beams exclusively at the first portion of the respective lenslet, and wherein the 2D scanner is configured to direct each of the second plurality of light beams exclusively at the second portion of the respective lenslet.

12. The HUD system of claim 1, wherein the 2D scanner is configured to steer the first plurality of light beams and the second plurality of light beams in a first dimension of the respective lenslet to steer a location of the eye-box.

13. The HUD system of claim 12, wherein the 2D scanner is configured to steer the first plurality of light beams and the second plurality of light beams in a second dimension of the respective lenslet to steer the first plurality of light beams at the first portion of the respective lenslet and to steer the second plurality of light beams at the second portion of the respective lenslet.

14. The HUD system of claim 13, wherein the 2D scanner is configured to steer the first plurality of light beams and the second plurality of light beams according to a Lissajous scanning pattern.

15. The HUD system of claim 1, wherein the 2D scanner is configured to steer the first plurality of light beams in a lateral dimension of the respective lenslet to steer a location of the first area of the eye-box, and wherein the 2D scanner is configured to steer the second plurality of light beams in the lateral dimension of the respective lenslet to steer a location of the second area of the eye-box.

16. The HUD system of claim 15, wherein each of the first plurality of light beams has a first beam width that is equal to or less than 30% of a size of the first portion, and wherein each of the second plurality of light beams has a second beam width that is equal to or less than 30% of a size of the second portion.

17. The HUD system of claim 1, further comprising:

an eye-tracking monitor configured to track a viewing direction of a user, wherein the 2D scanner is configured to steer the first plurality of light beams and the second plurality of light beams in a lateral dimension of the respective lenslet to steer a location of the eye-box based on the viewing direction of the user.

18. The HUD system of claim 1, further comprising:

an eye-tracking monitor configured to track a viewing direction of a user, wherein the 2D scanner is configured to steer the first plurality of light beams in a lateral dimension of the respective lenslet to steer a location of the first area of the eye-box based on the viewing direction of the user, and wherein the 2D scanner is configured to steer the second plurality of light beams in the lateral dimension of the respective lenslet to steer a location of the second area of the eye-box based on the viewing direction of the user.

* * * * *